(12) United States Patent
Naruse et al.

(10) Patent No.: US 6,708,787 B2
(45) Date of Patent: Mar. 23, 2004

(54) HYBRID CONSTRUCTION EQUIPMENT

(75) Inventors: Masami Naruse, Hirakata (JP); Masatake Tamaru, Tatsunokuchi-machi (JP); Kenzo Kimoto, Hirakata (JP)

(73) Assignee: Komatsu Ltd. (JP)

( * ) Notice: Subject to any disclaimer, the term of this patent is extended or adjusted under 35 U.S.C. 154(b) by 112 days.

(21) Appl. No.: 10/080,678

(22) Filed: Feb. 25, 2002

(65) Prior Publication Data

US 2002/0125052 A1 Sep. 12, 2002

(30) Foreign Application Priority Data

Mar. 12, 2001 (JP) .................................... 2001-068656

(51) Int. Cl.[7] .................................................. E02F 9/20
(52) U.S. Cl. ...................................... 180/53.8; 37/348
(58) Field of Search ..................... 172/2, 4.5, 7; 37/411, 37/348; 180/53.8

(56) References Cited

U.S. PATENT DOCUMENTS

| | | | | |
|---|---|---|---|---|
| 5,713,144 A | * | 2/1998 | Haraoka | 37/348 |
| 5,975,214 A | * | 11/1999 | Okamura et al. | 172/2 |
| 6,108,948 A | * | 8/2000 | Tozawa et al. | 37/348 |

FOREIGN PATENT DOCUMENTS

| | | | | |
|---|---|---|---|---|
| JP | 1013112 A | * | 4/1998 | F02D/29/04 |
| JP | 10-103112 | | 4/1998 | |
| JP | 2001011899 A | * | 1/2001 | E02F/9/20 |
| JP | 2001099103 A | * | 4/2001 | F15B/11/00 |
| JP | 2001207482 A | * | 8/2001 | E02F/9/20 |
| JP | 2002242234 A | * | 8/2002 | E02F/9/20 |

* cited by examiner

Primary Examiner—Brian L. Johnson
Assistant Examiner—Kelly E Campbell
(74) Attorney, Agent, or Firm—Rader, Fishman & Grauer PLLC

(57) ABSTRACT

Hybrid construction equipment leveling an engine load and effectively performing regeneration of energy is provided. For this purpose, the construction equipment includes a hydraulic pump (2) and a first electric motor (7) driven by an engine (1), a battery (9) for charging electric power generated by the first electric motor, a second electric motor (10) driven by electric power of the battery and functioning as a generator at a time of braking revolution, a swash plate angel sensor 33 and a pressure sensor 34 for the hydraulic pump, and a controller (5) for controlling the first electric motor as a generator by surplus torque when absorption torque is smaller than predetermined output torque of the engine and controlling the first electric motor as a motor to generate an amount of shortage of torque when the absorption torque is larger than the predetermined torque.

2 Claims, 3 Drawing Sheets

HYBRID CONSTRUCTION EQUIPMENT

TECHNICAL FIELD

The present invention relates to hybrid construction equipment.

BACKGROUND ART

As for conventional construction equipment, a hydraulic drive type is mainstream. For example, a hydraulic shovel performs driving of a working machine, revolving of an upper revolving superstructure and traveling of a lower traveling unit with a hydraulic actuator (for example, a hydraulic cylinder, a hydraulic motor and the like). An operation is carried out by controlling pressure oil discharged from a hydraulic pump with an engine as a driving source and supplied to the hydraulic actuator as described above.

Operations of the hydraulic shovel include not only operations always requiring 100% of a capacity of an engine, but also many operations that only require, for example, 90% or 80% of its capacity. Specifically, as shown in an engine torque characteristic diagram in FIG. 3, in regard to a point PH of "a heavy load mode" in which a heavy load operation with 100% of its output is performed, operation modes such as a point PS of "an ordinary load mode" in which an ordinary load operation is performed, and a point PL of "a light load mode" in which a light load operation is performed are set. At each of the points PH, PS and PL, an equal horsepower control is performed so that absorption torque of a hydraulic pump matches with output torque of the engine, whereby the output of the engine is effectively utilized to improve fuel economy. Here, "equal horsepower control for matching" means controlling the discharge amount of the hydraulic pump according to a PQ curve (an equal horsepower curve) so as to be able to obtain the absorption torque at the matching point. Further, the absorption torque of the hydraulic pump means torque required of the engine by the hydraulic pump to drive a hydraulic actuator.

In the above-described hydraulic shovel, mounted is an engine having output power corresponding to the maximum required horsepower when a vehicle performs operations, that is, an engine with a rated output point PH of the engine torque curve corresponding onto a maximum required horsepower line L shown in FIG. 3.

FIG. 4 is a graph showing a transition of absorption horsepower of the hydraulic pump in one cycle when "an excavating and loading operation" in which excavated earth and sand are rotated and loaded into a damp vehicle is carried out in "the ordinary load mode" in which matching is achieved with 90% of rated output power of the engine. Load change of the hydraulic shovel is very sharp as compared with a passenger car and the like. However, as shown in FIG. 4, there is an allowance in the engine horsepower, and an average load rate with respect to the maximum horsepower of the engine in one cycle is about 80%, and the average load rate of the engine when measured with a day's operation including traveling, waiting for damp vehicles and the like is about 60%. When the operation by "the heavy load mode" is performed, the average load rate does not become 100% because of a load change. Specifically, in a hydraulic shovel equipped with the engine having output power corresponding to the maximum required horsepower, the output power that the engine can produce cannot be effectively used.

As an art of eliminating the disadvantage, so-called hybrid construction equipment disclosed in, for example, Japanese Patent Laid-open No. 10-103112, which includes an engine, a generator driven by the engine, a battery for charging electric power generated thereby, and an electric motor driven by the electric power of this battery, is proposed. Using FIG. 5, a hybrid hydraulic shovel in the above-described Japanese Patent Laid-open No. 10-103112 will be explained.

Pressure oil discharged from a variable displacement type of hydraulic pump 52 driven by an engine 51 is supplied to a hydraulic cylinder 54a for driving a working machine and a hydraulic motor 54b for driving to travel, via a control valve 53. Pressure oil of an accumulator 56 held at fixed or higher pressure by pressure accumulation aiding means 55 is supplied to a hydraulic pump motor 58 for revolution via the control valve 57. As a result, the hydraulic cylinder 54a, the hydraulic motor 54b and the hydraulic pump motor 58 are driven, which makes it possible to drive the working machine, make a lower traveling unit travel, and revolve an upper revolving superstructure. When revolution is braked, the hydraulic pump motor 58 is switched into a pump operation, and following the rotation of the hydraulic pump motor 58, inertia energy is regenerated in the accumulator 56 as pressure energy.

The hydraulic pump 52 is equipped with a first electric motor 60 also serving as a generator, for which a controller 61 performs a switching control between a generating operation and an assisting operation and a torque control in each of them. Similarly, the hydraulic pump motor 58 is equipped with a second electric motor 62 also serving as a generator, for which a revolution controller 63 performs a switching control between a generating operation and an assisting operation and a torque control in each of them. A battery 64 is connected to the controller 61 and the revolution controller 63, and it accumulates electric energy obtained from the generating operations of the first and second electric motors 60 and 62 and discharges electric energy necessary for the assisting operations of the first and second electric motors 60 and 62.

The engine 51 the speed of which is governed by a governor 51a normally drives at a fixed engine speed. When an operation load is small, and absorption torque of the hydraulic pump 52 is smaller than output torque of the engine 51, the controller 61 switches the first electric motor 60 into a generating operation, performs a torque control of the first electric motor 60 so as to generate electric power by surplus torque, and charges electric energy generated from the surplus torque in the battery 64. When an operation load is large, and absorption torque of the hydraulic pump 52 is larger than output torque of the engine 51, the controller 61 switches the first electric motor 60 into an assisting operation, and performs a torque control of the first electric motor 60 so as to generate an amount of shortage of torque from discharge energy from the battery 64.

Based on a command value by a revolution operating lever 65 and a detection value by a rotation sensor 66, the revolution controller 63 performs (1) a torque control of the second electric motor 62 so as to carry out an assisting operation for speeding-up rotation during a motor operation of the hydraulic pump motor 58, or (2) a torque control of a generating operation of the second electric motor 62 so as to convert inertia energy exceeding a capacity of the accumulator 56 and regenerate it during a pump operation of the hydraulic pump motor 58.

According to the above-described constitution, power generation is carried out by surplus torque of the engine 51 when an operation load is small, thus making it possible to effectively use the engine 51, and energy regeneration is carried out at the time of braking revolution. When the operation load is large, absorption torque of the hydraulic pump 52 is increased by the assisting operation by discharge from the battery 64, and therefore an operation can be carried out with larger absorption torque than the maximum generation torque of the engine 51. Specifically, the engine 51 can be effectively used while energy conservation is achieved.

However, in the art disclosed in the above-described Laid-open Patent, the hydraulic pump motor 58 for revolution is driven by pressure oil supply from the accumulator 56, and therefore a hydraulic circuit including the pressure accumulation assisting means 55 (for example, an electric motor and a hydraulic pump), the control valve 57 and the accumulator 56, which makes a system complicated. Further, since part of energy generated by the engine 51 is recovered at the time of braking revolution, the engine output can be decreased more than the prior art, but since recovering amount of energy is not enough, the engine 51 cannot be made sufficiently compact.

SUMMARY OF THE INVENTION

The present invention is made in view of the above-described disadvantage, and its object is to provide hybrid construction equipment, which can make an engine compact by leveling a load exerted on the engine and efficiently regenerating energy with a simple system.

In order to attain the above-described object, hybrid construction equipment according to the present invention is hybrid construction equipment including, on an upper revolving superstructure rotatably placed on a lower traveling unit, an engine, a hydraulic pump driven by the engine, a hydraulic actuator driven by discharge oil from the hydraulic pump, a first electric motor driven by the engine, a battery for charging electric power generated by the first electric motor, and a second electric motor driven by electric power of the battery, and has the constitution in which the second electric motor is the electric motor for revolving the upper revolving superstructure, which functions as a generator at a time of braking revolution of the upper revolving superstructure and charges generated electric power into the battery, and the hybrid construction equipment further includes
absorption torque detecting means for detecting absorption torque of the hydraulic pump, and
a controller for comparing predetermined output torque of the engine, which is fixed according to an engine property, and absorption torque of the hydraulic pump detected by the absorption torque detecting means, controlling the first electric motor to function as a generator by surplus torque when the absorption torque of the hydraulic pump is smaller than the predetermined output torque of the engine, and controlling the first electric motor to function as a motor so that it generates an amount of shortage of torque when the absorption torque of the hydraulic pump is larger than the predetermined torque of the engine.

According to the above constitution, when the working load is small, and the absorption torque of the hydraulic pump is smaller than the predetermined output torque of the engine, the first electric motor is made to function as a generator and power is generated with a surplus amount of the engine output power and is charged into and stored in the battery. On the other hand, when the working load is large, and the absorption torque of the hydraulic pump is larger than the predetermined output torque of the engine, the first electric motor is made to function as a motor, and this is driven by the stored electric power to generate an amount of shortage of torque to assist the engine to drive the hydraulic pump. Specifically, the output power of the engine is used in such a manner as to "store a surplus when there is the surplus, and provides what is stored when it is insufficient", and therefore energy-saving and leveling of the load exerted on the engine can be achieved. As a result, the engine having the rated output power corresponding to the average required horsepower can be adopted while the absorption torque of the hydraulic pump is maintained.

Since the revolution driving system is electrically powered, it is possible to constitute the system of the revolution driving system by a simple system without a hydraulic device, inertia energy of the revolving superstructure can be converted into electric energy and regenerated at the time of braking revolution. By performing regeneration of the revolution, part of the engine output power is efficiently recovered. Since the energy regeneration is carried out, the above-described average required horsepower becomes lower, and the adopted engine can be made sufficiently compact.

Further, in the hybrid construction equipment,
the hydraulic actuator is a boom cylinder, and
the hybrid construction equipment may have the constitution further including
a hydraulic motor rotated by return oil from a bottom side of the boom cylinder, and
a generator connected to the hydraulic motor and charging generated electric power into the battery.

According to the above constitution, the system for generating power by using the high-pressure return oil from the boom cylinder is used, and thus the potential energy of the working machine can be converted into electric energy and regenerated. As a result that the regeneration at the time of lowering the boom is performed, the average required horsepower becomes lower than the first aspect of the invention, and therefore the engine can be made further compact.

BEST MODE FOR CARRYING OUT THE INVENTION

A preferred embodiment will be explained in detail below with reference to the drawings.

Figure 1:
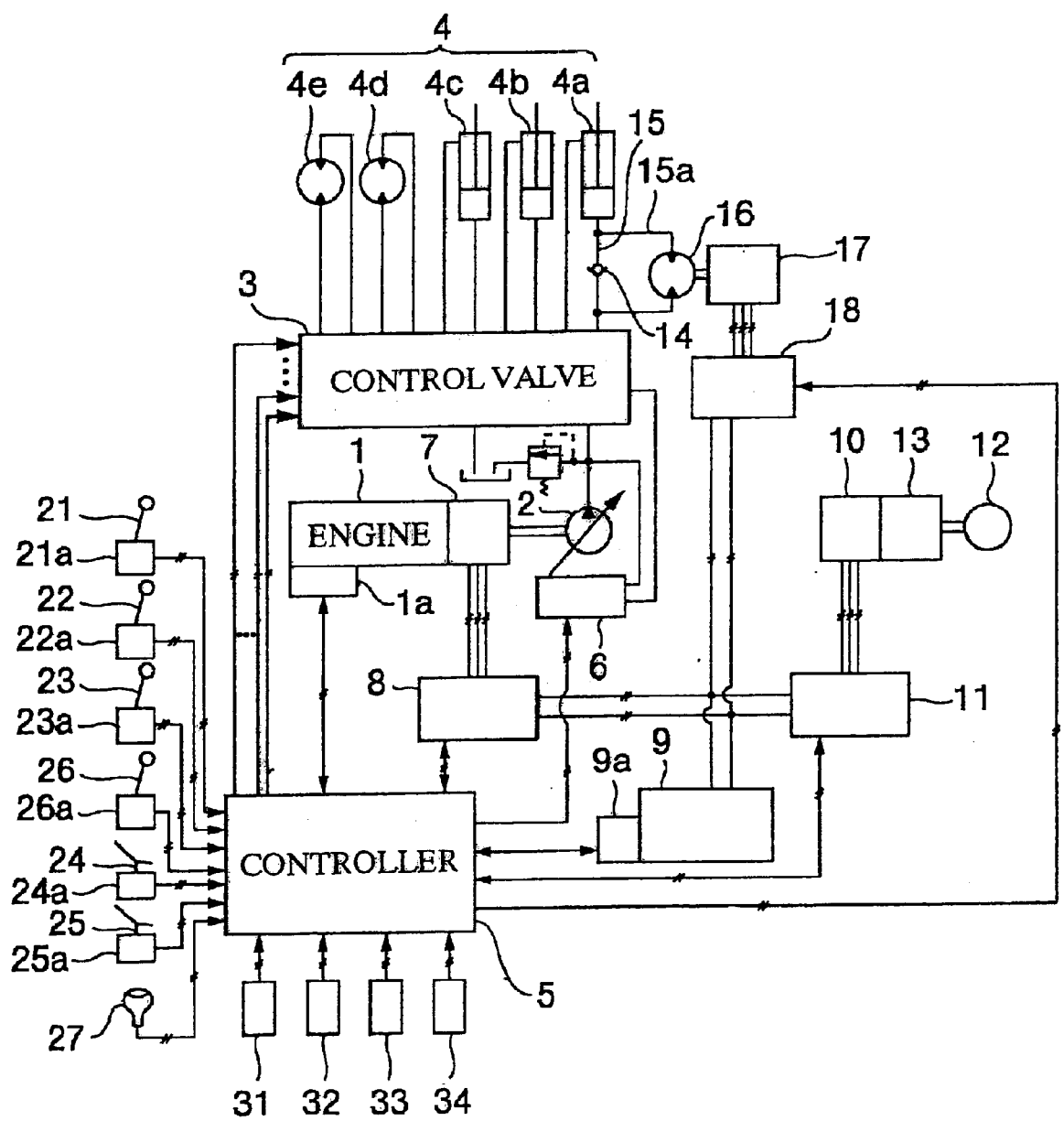
FIG. 1 is a block diagram of a hybrid system according to an embodiment of the present invention.

FIG. 1 is a block diagram of a driving system in a case where example equipment of construction equipment to which the present invention is applied is a hydraulic shovel. Pressure oil discharged from a variable displacement hydraulic pump 2 driven by an engine 1 is supplied to a hydraulic actuator 4 via a control valve 3. The hydraulic actuator 4 includes a boom cylinder 4a, an arm cylinder 4b, a bucket cylinder 4c, a right side traveling motor 4d and a left side traveling motor 4e. Speed of the engine 1 is governed by a governor 1a receiving a governor command from a controller 5. A rotational angle of a swash plate of the hydraulic pump 2 is driven by swash plate angle driving means 6 driving in accordance with a load exerted on the hydraulic actuator 4 and a command from the controller 5 to control a discharge amount of the pressure oil from the hydraulic pump 2.

The engine 1 is equipped with a first electric motor 7 integrated with a flywheel. Specifically, the first electric motor 7 is an induction motor with the flywheel as a rotor around which a stator is provided, and it also has a function as a generator. Accordingly, the first electric motor 7 can be operated by being switched into a motor operation of assisting the engine 1 to drive the hydraulic pump and a generating operation of generating power with the engine 1 as a driving source. The first electric motor 7 is connected to a battery 9 via a first inverter 8. The first inverter 8 controls the generating operation and the motor operation of the first electric motor 7 as will be described later in accordance with a command from the controller 5.

12 denotes an upper revolving superstructure of the hydraulic shovel, which is rotatable by a second electric motor 10 connected thereto via a speed reducer 13. The second electric motor 10 has a function as a generator similarly to the first electric motor 7, and is an induction motor which can be operated by being switched into a motor operation of driving the upper revolving superstructure 12 and a generating operation by inertia energy of the upper revolving superstructure 12 at the time of braking revolution. The second electric motor 10 is connected to the battery 9 via a second inverter 11. The second inverter 11 controls the generating operation and the motor operation of the second electric motor 10 as will be described later in accordance with a command from the controller 5.

A pipe line 15 at a bottom side of the boom cylinder 4a is provided with a bypass pipe line 15a including a hydraulic motor 16. Return oil from the boom cylinder 4a at the time of retraction of a boom cylinder (at the time of lowering a boom) passes through the bypass pipe line 15a by a check valve 14 of the pipe line 15, and at this time, the hydraulic motor 16 is driven. A generator 17 is connected to the hydraulic motor 16, and the generator 17 is connected to the battery 9 via an AC/DC converter 18.

The battery 9 is a secondary battery such as a lithium ion cell. This kind of battery is in an unstable state when it has high temperature because the inner pressure rises, and decomposition of an electrolytic solution and the like occur, and therefore it is necessary to strictly control the temperature thereof. For this purpose, an attached battery controller 9a always monitors electric voltage, current, temperature and the like of the battery 9 to control temperature and charge and discharge.

The controller 5 inputs detection signals from operating amount detectors (for example, potentiometers) 21a, 22a, 23a, 24a and 25a provided at a boom operating lever 21, an arm operating lever 22, a bucket operating lever 23, a right side traveling pedal 24 and a left side traveling pedal 25, respectively, which are operated by an operator. The controller 5 controls the control valve 3 by driving means (not shown) in accordance with the inputted detection signals to control flow rate of the pressure oil supplied to the corresponding hydraulic actuator 4. The controller 5 also inputs a detection signal from an operating amount detector 26a provided at a revolution operating lever 26 and controls the motor operation of the second electric motor 10 via the second inverter 11. 27 denotes an operating switch provided at a knob of any one of the operating levers 21, 22 and 23, and this is the switch which is operated when an excavating force needs to be increased for a short time.

The controller 5 inputs detection signals from an engine speed sensor 31 for detecting engine speed of the engine 1 and a torque sensor 32 for detecting output torque of the engine 1. The controller 5 also inputs detection signals from a swash plate angle sensor 33 for detecting a swash plate angle of the hydraulic pump 2 and a pressure sensor 34 for detecting discharge pressure of the hydraulic pump 2. In this embodiment, the swash plate angle sensor 33 and the pressure sensor 34 constitute absorption torque detection means of the hydraulic pump 2. It should be noted that this absorption torque detection means is not limited to these sensors 33 and 34, but it may be any device or component so long as it has the function of detecting the absorption torque of the hydraulic pump 2.

Figure 2:
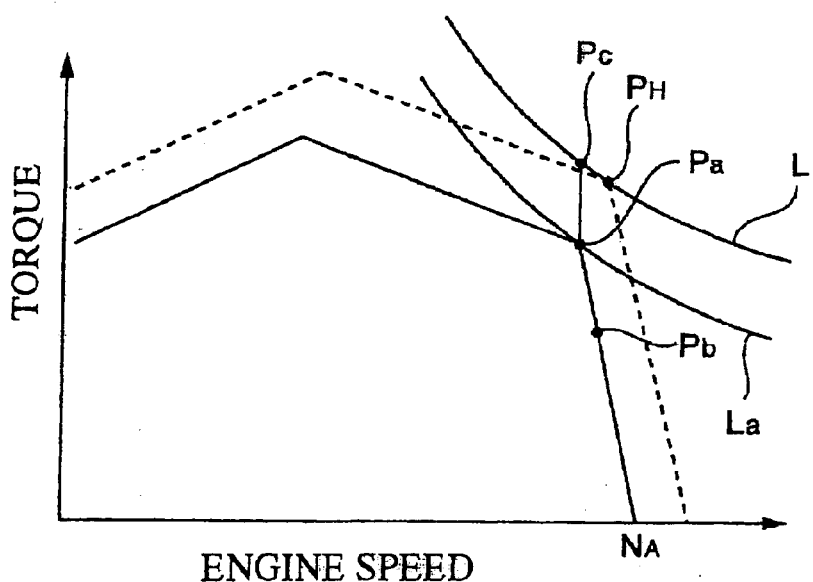
FIG. 2 is an engine torque characteristic diagram according to the embodiment of the present invention.
Figure 3:
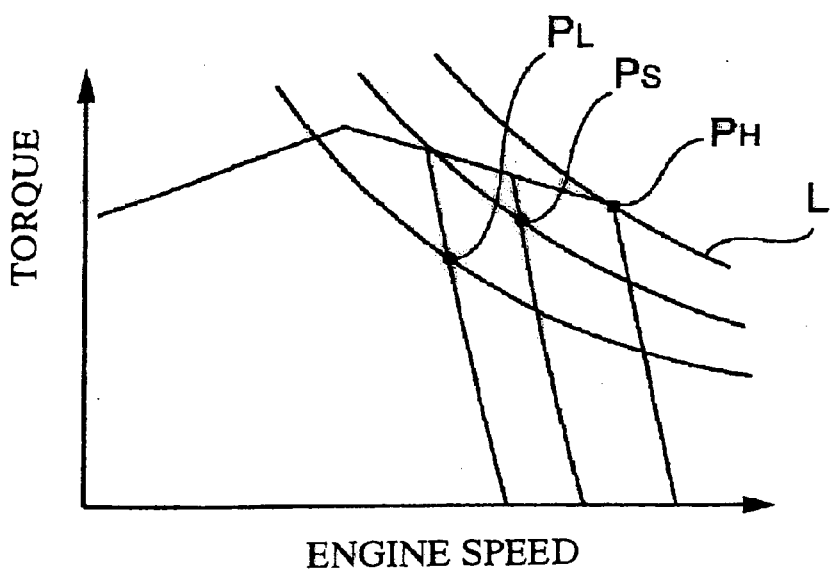
FIG. 3 is an engine torque characteristic diagram according to a prior art.

In operating time, the controller 5 transmits a governor command of rated rotation NA to the governor, and the engine 1 has an engine torque characteristic as shown in FIG. 2. The controller 5 controls the first electric motor 7 as will be described later via the first inverter 8 so as to perform constant torque and constant rotation drive at a rated output point Pa of the engine torque characteristic. In FIG. 2, La is an average required horsepower curve that will be described later. The engine torque characteristic shown by the broken line is an engine torque characteristic of a conventional hydraulic shovel, and it has a rated output point PH equal to the maximum required horsepower L needed by the hydraulic shovel to perform an operation.

(1) When Load Torque is Smaller Than Engine Output Torque

When working load is small, and the absorption torque of the hydraulic pump 2 is smaller than the output torque of the engine 1 (for example, a point Pb in FIG. 2), the controller 5 makes the first electric motor 7 perform a generating operation by surplus torque.

Specifically, the controller 5 compares pump absorption torque obtained from pump discharge pressure and a swash plate angle, and rated torque, then calculates surplus torque, and controls a current passing to the first electric motor 7 in the first inverter 8 so that the surplus torque works on the first electric motor 7 as power generating torque. The electric energy generated by this surplus torque is charged into the battery 9.

Accordingly, part of the output power of the engine 1 is absorbed by the hydraulic pump 2 and consumed for driving the working machine, and the rest of it is absorbed by the first electric motor 7 performing a generating operation and is charged into the battery 9 as electric energy.

(2) When Load Torque is Larger Than Engine Output Torque

When operation torque is large and the absorption torque of the hydraulic pump 2 is larger than the output torque of the engine 1 (for example, a point Pc in FIG. 2), the controller 5 made the first electric motor 7 to perform a motor operation to generate an amount of shortage of torque, and assists the engine 1 to drive the hydraulic pump 2.

Specifically, the controller 5 compares pump absorption torque obtained from pump discharge pressure and a swash plate angle and rated torque, then calculates shortage of torque, and controls a current supplied to the first electric motor 7 from the battery 9 in the first inverter 8 so that the first electric motor 7 outputs the shortage of torque.

Accordingly, all the output power of the engine 1 is absorbed by the hydraulic pump 2, and the first electric motor 7 receives power supply from the battery 9 and generates shortage of torque for driving the working machine, whereby the absorption torque of the hydraulic pump 2 is increased to be the conventional maximum required horsepower as the point Pc in FIG. 2.

According to the controls in the above-described items (1) and (2), if there is a surplus in the torque of the engine 1, power generation is performed with a surplus amount, and if there is shortage of the torque of the engine 1, assistance by the motor operation is received, whereby load exerted on the engine 1 is leveled. As a result, the engine 1 can carry out constant torque and constant rotation drive at the rated output point Pa irrespective of a magnitude of the working load.

At the time of a revolving operation, the controller 5 inputs an operation signal according to an operating amount of the revolution operating lever 26 from the operating amount detector 26a, and controls the motor operation of the second electric motor 10 via the second inverter 11 according to this operation signal. Consequently, a revolving speed according to the lever operating amount is obtained. At the time of braking revolution, the controller 5 switches the second electric motor 10 into the power generating operation so that torque is generated in a direction to brake the revolution, and performs energy regeneration in which inertia energy of the upper revolving superstructure 12 is converted into electric energy and charged into the battery 9.

Pressure oil of a bottom chamber of the boom cylinder 4a supporting dead weight of the working machine (a boom, an arm, a bucket and the like) and a bucket load is at high pressure, and when the boom is lowered, high-pressure return oil from the boom cylinder 4a drives the hydraulic motor 16 provided at the bypass pipe line 15a. As a result, the generator 17 connected to the hydraulic motor 16 is driven to generate power, and the generated power is converted into a direct current at the AC/DC converter 18, supplied and charged into the battery 9. Specifically, when the boom is lowered, energy regeneration is carried out by converting potential energy into electric energy.

There is a case in which an operation is desired to be performed by increasing excavating force for a specified period of time as in the case of digging up embedded rocks and the like, during excavation of earth and sand. In this case, when the operator turns on the operating switch 27, the controller 5 increases the speed of the engine 1 by a predetermined amount and increases assisting torque of the motor operation of the first electric motor 7 by a predetermined amount to increase the absorption horse power of the hydraulic pump 2. Thus, the above-described increased excavating force is obtained. This control provides drive exceeding rating, and therefore it is desirable that the control is automatically released after a lapse of a predetermined time (for example, 5 seconds) after the load disappears.

In the present invention, energy regeneration at the time of driving and braking revolution can be performed with a simple system without a hydraulic device by motorizing the revolution-driving source. Further, since the system for generating power using high-pressure return oil from the boom cylinder is used, the potential energy of the working machine is regenerated into electric energy, and thus energy saving can be achieved.

By leveling a load exerted on the engine, a surplus amount of engine output power is stored as electric energy to achieve energy saving, and when output power becomes insufficient, the stored electric energy is released to maintain the conventional pump absorption torque. As a result, it is made possible to adopt an engine having rated output power corresponding to an average required horsepower. This average required horsepower can be set to be lower than the conventional average load in FIG. 4 because part of the engine output power is effectively recovered by the regeneration at the time of braking revolution and the regeneration at the time of lowering the boom. Consequently, it is possible to make the engine sufficiently compact. In addition, rated drive of the engine with the smaller rated horsepower than the prior art is performed, and therefore improvement in fuel economy and exhaust gas (for example, reduction of $CO_2$ exhaust) can be attained.

Figure 4:
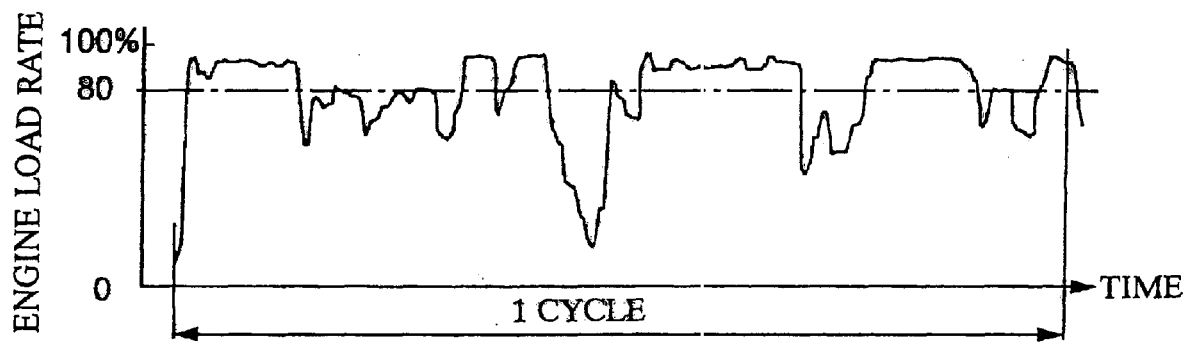
FIG. 4 is a graph showing a load change of a hydraulic shovel according to the prior art.
Figure 5:
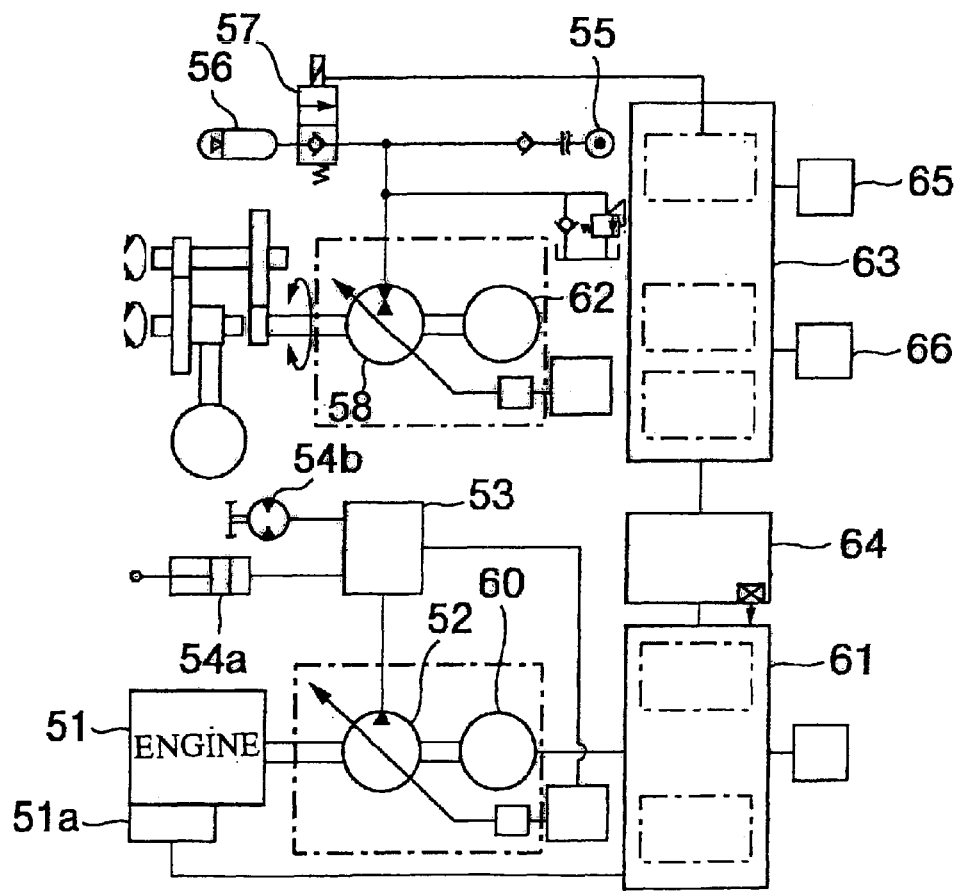
FIG. 5 is a block diagram of a hybrid system of the prior art.

The above-described average required horsepower may be set in consideration of an energy regeneration amount to the average load rate of one cycle of "the excavating and loading operation" in FIG. 4, or without being limited to this, it may be set in consideration of the energy regeneration amount to the average load rate of a daily operation. As the energy regeneration, regeneration at the time of braking revolution and regeneration at the time of lowering the boom are carried out, but only either one of them may be carried out. The explanation is made with an example in which the engine is driven at the rated output point, but it goes without saying that the similar effect can be obtained if only it is driven in the vicinity of the rated point. Further, the explanation is made with the hydraulic shovel cited as an example, but the present invention may be applied to other construction equipment such as a crane vehicle.

What is claimed is:

1. Hybrid construction equipment comprising, on an upper revolving superstructure rotatably placed on a lower traveling unit, an engine, a hydraulic pump driven by said engine, a hydraulic actuator driven by discharge oil from said hydraulic pump, a first electric motor driven by said engine, a battery for charging electric power generated by said first electric motor, and a second electric motor driven by electric power of said battery, wherein said second electric motor is the electric motor for revolving said upper revolving superstructure, which functions as a generator at a time of braking revolution of said upper revolving superstructure and charges generated electric power into said battery, said hybrid construction equipment further comprising:
    absorption torque detecting means for detecting absorption torque of said hydraulic pump;
    a controller for comparing predetermined output torque of said engine fixed according to an engine characteristic and absorption torque of said hydraulic pump detected by said absorption torque detecting means, controlling said first electric motor to function as a generator by surplus torque when the absorption torque of said hydraulic pump is smaller than the predetermined output torque of said engine, and controlling said first electric motor to function as a motor so that it generates an amount of shortage of torque when the absorption torque of said hydraulic pump is larger than the predetermined torque of said engine; and
    a hydraulic motor rotated by return oil from a bottom side of said hydraulic actuator.

2. The hybrid construction equipment according to claim 1, wherein said hydraulic actuator is a boom cylinder, said hybrid construction equipment further comprising:
    a generator connected to said hydraulic motor and charging generated electric power into said battery.

* * * * *

UNITED STATES PATENT AND TRADEMARK OFFICE
CERTIFICATE OF CORRECTION

PATENT NO. : 6,708,787 B2
DATED : March 24, 2004
INVENTOR(S) : Masami Naruse et al.

It is certified that error appears in the above-identified patent and that said Letters Patent is hereby corrected as shown below:

<u>Title page,</u>
Item [57], ABSTRACT,
Line 9, replace "angel" with -- angle --.

Signed and Sealed this

Sixth Day of July, 2004

JON W. DUDAS
*Acting Director of the United States Patent and Trademark Office*